United States Patent
Walenta et al.

(10) Patent No.: US 11,117,583 B2
(45) Date of Patent: Sep. 14, 2021

(54) BRAKE SYSTEM FOR AN ARTICULATED VEHICLE

(71) Applicant: Caterpillar Inc., Deerfield, IL (US)

(72) Inventors: Clayton D. Walenta, Peoria, IL (US); Anthony J. Weltzer, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 109 days.

(21) Appl. No.: 16/355,322

(22) Filed: Mar. 15, 2019

(65) Prior Publication Data

US 2020/0290617 A1 Sep. 17, 2020

(51) Int. Cl.
*B60W 30/18* (2012.01)
*B60T 8/171* (2006.01)
(Continued)

(52) U.S. Cl.
CPC ........ *B60W 30/18145* (2013.01); *B60T 7/12* (2013.01); *B60T 8/171* (2013.01); *B60T 8/172* (2013.01); *B60T 8/176* (2013.01); *B60T 8/326* (2013.01); *B60T 8/34* (2013.01); *B60T 13/686* (2013.01); *B60T 15/028* (2013.01); *B60W 10/10* (2013.01); *B60W 10/12* (2013.01); *B60W 10/188* (2013.01); *B60W 10/20* (2013.01); *B60W 30/045* (2013.01);
(Continued)

(58) Field of Classification Search
CPC ....... B60W 30/18145; B60W 2710/12; B60W 10/10; B60W 10/188; B60W 30/045; B60W 10/20; B60W 10/12; B60W 2520/28; B60W 2710/10; B60W 2710/18; B60W 2710/20; B60W 2510/20; B60T 8/171; B60T 8/172; B60T 8/176; B60T 15/028; B60T 8/34; B60T 2270/10; B60T 2270/20; B60T 2201/16; B60T 2240/00; B60T 2250/00; B60T 7/12; B60T 8/326; B60T 13/686

See application file for complete search history.

(56) References Cited

U.S. PATENT DOCUMENTS 5,102,202 A 4/1992 Breen
6,213,572 B1 4/2001 Linkner, Jr. et al.
(Continued)

FOREIGN PATENT DOCUMENTS

WO WO 2018/133948 A1 7/2018

OTHER PUBLICATIONS

Honeywell International Inc., "6DF Series: 6 Degrees of Freedom Inertial Measurement Unit, 6-D Motion Variant," datasheet 2013 [retrieved on Mar. 23, 2020] retrieved fro the Internet: <URL https://www.mouser.com/datasheet/2/187/honeywell-sensing-inertial-measurement-unit-6df-pr-372034.pdf. pp. 1-3.

*Primary Examiner* — Pamela Rodriguez
(74) *Attorney, Agent, or Firm* — von Briesen & Roper, s.c.

(57) ABSTRACT

A brake system for an articulated vehicle is disclosed. The brake system includes a brake assembly coupled to a traction device, the brake assembly being configured to apply a brake-assembly pressure based on one of a hydro-mechanical pressure signal and an electro-mechanical pressure signal. A blocking valve is configured to block the hydro-mechanical pressure signal when closed. A brake controller, is configured to transmit an isolation signal configured to close the blocking valve and transmit an ABS control signal that is based on a commanded ABS brake pressure.

12 Claims, 3 Drawing Sheets

(51) Int. Cl.

| | |
|---|---|
| *B60T 8/172* | (2006.01) |
| *B60T 8/176* | (2006.01) |
| *B60T 15/02* | (2006.01) |
| *B60T 13/68* | (2006.01) |
| *B60T 8/32* | (2006.01) |
| *B60T 8/34* | (2006.01) |
| *B60W 10/10* | (2012.01) |
| *B60W 10/188* | (2012.01) |
| *B60W 30/045* | (2012.01) |
| *B60W 10/20* | (2006.01) |
| *B60W 10/12* | (2012.01) |
| *B60T 7/12* | (2006.01) |

(52) U.S. Cl.
CPC ....... *B60T 2201/16* (2013.01); *B60T 2240/00* (2013.01); *B60T 2250/00* (2013.01); *B60T 2270/10* (2013.01); *B60T 2270/20* (2013.01); *B60W 2510/20* (2013.01); *B60W 2520/28* (2013.01); *B60W 2710/10* (2013.01); *B60W 2710/12* (2013.01); *B60W 2710/18* (2013.01); *B60W 2710/20* (2013.01)

(56) References Cited

U.S. PATENT DOCUMENTS

| | | | |
|---|---|---|---|
| 8,463,511 | B2 | 6/2013 | Uematsu et al. |
| 8,919,891 | B2 | 12/2014 | McCann et al. |
| 9,061,664 | B2 | 6/2015 | McCann |
| 9,086,104 | B2 | 7/2015 | McCann et al. |
| 9,126,480 | B2 | 9/2015 | McCann et al. |
| 9,296,295 | B2 * | 3/2016 | McCann ................ B60T 8/885 303/15 |
| 9,623,851 | B1 | 4/2017 | Cymbal |
| 9,994,104 | B2 | 6/2018 | Hertel et al. |
| 2002/0005662 | A1 | 1/2002 | Yasui et al. |
| 2010/0219679 | A1 | 9/2010 | Toyohira et al. |
| 2011/0246031 | A1 | 10/2011 | Uematsu et al. |
| 2012/0031692 | A1 | 2/2012 | Koike |

* cited by examiner

BRAKE SYSTEM FOR AN ARTICULATED VEHICLE

TECHNICAL FIELD

This disclosure relates to brake systems and, more specifically, to brake systems for an articulated vehicle.

BACKGROUND

Braking a vehicle in a controlled manner under adverse conditions such as rain, snow, or ice generally requires precise application of the brakes by the vehicle driver. Under these conditions, or in panic stop situations, a driver will often apply excessive brake pressure, thereby causing the wheels to lockup and slip or skid on the road surface. Wheel lockup conditions can lead to loss of directional stability and, possibly, uncontrolled vehicle spinout.

In a continuing effort to improve the operational safety of vehicles, antilock braking systems have been developed. While such systems are adapted to control the braking of each braked wheel of a vehicle, some systems have been developed for controlling the braking of only a portion of the braked wheels. Generally, antilock brake systems are electrohydraulic and include a controller and sensors for monitoring the speed of the controlled wheels to determine the deceleration of the controlled wheels. Antilock brake systems also include one or more hydraulic circuits for applying pressure to the brakes of the controlled wheels. When the brakes of the vehicle are applied and the wheel deceleration of the monitored wheels exceeds a predetermined deceleration threshold, indicating that there is wheel slippage and the wheels are approaching a lockup condition, the controller functions to control the application of hydraulic pressure through a series of valves associated with the brakes to prevent a lockup of the controlled wheels. Typically, the controller will deactivate and activate the valves to cyclically release and reapply pressure to the brakes to limit wheel slippage to a safe level while continuing to produce adequate brake torque to decelerate the vehicle as desired by the driver.

U.S. Pat. No. 8,919,891 describes one such antilock brake system. The '891 patent discloses a brake pedal sensor linked to a brake pedal. The brake pedal is coupled to a normally closed brake pedal valve. The brake pedal valve includes an inlet in communication with a source of pressurized hydraulic fluid and an outlet in communication with a normally open isolation valve. The isolation valve may be in communication with one or more main control valve systems and may be linked to a controller which maintains the isolation valve in a closed position during normal operating conditions. The isolation valve then shifts to an open position in the event current supply from the controller is interrupted as a result of an electrical failure or malfunction of the controller.

While arguably effective for its intended purpose, there is still need for improved braking systems for articulated vehicles.

SUMMARY OF THE DISCLOSURE

In one aspect, an antilock brake system for a vehicle is disclosed. The brake system includes a brake assembly coupled to a traction device, the brake assembly configured to apply a brake-assembly pressure to reduce a rotational speed of the traction device. The brake-assembly pressure is based on one of a hydro-mechanical pressure signal and an electro-mechanical pressure signal. A hydro-mechanical brake control valve is configured to output the hydro-mechanical pressure signal that is based on a displacement of a brake pedal. An electro-mechanical brake control valve is configured to output the electro-mechanical pressure signal that is based on an antilock brake system (ABS) control signal.

A blocking valve is configured to permit the hydro-mechanical pressure signal to control the brake-assembly pressure when the blocking valve is open and to block the hydro-mechanical pressure signal from controlling the brake-assembly pressure when the blocking valve is closed. A brake controller is configured to determine a target corner speed for the traction device based at least in part on a speed of the articulated vehicle and a desired slip ratio, and responsive to determining that a traction device speed is less than the target corner speed: transmit, to the blocking valve, an isolation signal that is configured to close the blocking valve, determine a commanded ABS brake pressure, and transmit, to the electro-mechanical brake control valve, an ABS control signal that is based on the commanded ABS brake pressure.

Another embodiment takes the form of a second brake system for an articulated vehicle, the second brake system including a front brake assembly configured to apply a front brake-assembly pressure to a front traction device in response to receiving one of a front hydro-mechanical pressure signal and a front electro-mechanical pressure signal. The second brake system further includes a rear brake assembly configured to apply a rear brake-assembly pressure to reduce a rotational speed of a rear traction device in response to receiving one of a rear hydro-mechanical pressure signal and a rear electro-mechanical pressure signal.

The second brake system also includes a front electro-mechanical brake control valve and a rear electro-mechanical brake control valve, the front and rear electro-mechanical brake control valves configured to output the front electro-mechanical pressure signal and the rear electro-mechanical pressure signal, respectively, that are both based at least in part on a respective front and a rear antilock brake system (ABS) control signal. A front blocking valve and a rear blocking valve are configured to permit the respective hydro-mechanical pressure signal to control the respective front and rear brake assembly pressures when the respective blocking valve is open, and to block the respective hydro-mechanical pressure signal from controlling the respective brake-assembly pressures when the respective blocking valve is closed.

A brake controller in the second brake system is configured to determine a respective target corner speed for the front and rear traction devices based at least in part on a speed of the articulated vehicle and a desired slip ratio. Responsive to determining that a speed of at least one of the front and rear traction device is less than the respective target corner speed, the brake controller transmits, to the front and rear blocking valves, an isolation signal configured to close the front and rear blocking valves, determines a commanded ABS brake pressure, and transmits, to the front and rear electro-mechanical brake control valves, a front and a rear ABS control signal that is based on the commanded ABS brake pressure.

Yet another embodiment takes the form of a method of braking an articulated vehicle. The method includes depressing a brake pedal that is mechanically coupled to a hydro-mechanical brake control valve to produce a hydro-mechanical pressure signal. A first brake-assembly pressure is provided to a brake assembly, the brake assembly being coupled to a traction device and the first brake-assembly pressure is based on the hydro-mechanical pressure signal and is configured to reduce a rotational speed of the traction device. A target corner speed for the traction device is determined based at least in part on a speed of the articulated vehicle and a desired slip ratio. Responsive to determining that a traction device speed is less than the target corner speed, the brake controller transmits, to a blocking valve, an isolation signal configured to close the blocking valve. When the blocking valve is in an open position the hydro-mechanical pressure signal controls the first brake-assembly pressure and when the blocking valve is in a closed position the hydro-mechanical pressure signal is blocked from controlling the first brake-assembly pressure. A commanded ABS brake pressure is determined based on the depression of the brake pedal. The brake controller transmits, to an electro-mechanical brake control valve, an ABS control signal that is based on the commanded ABS brake pressure. A second brake-assembly pressure is provided to the brake assembly, the second brake-assembly pressure being based on the commanded ABS brake pressure.

These and other aspects and features of the present disclosure will be more readily understood when read in conjunction with the accompanying drawings.

DETAILED DESCRIPTION

Figure 1:
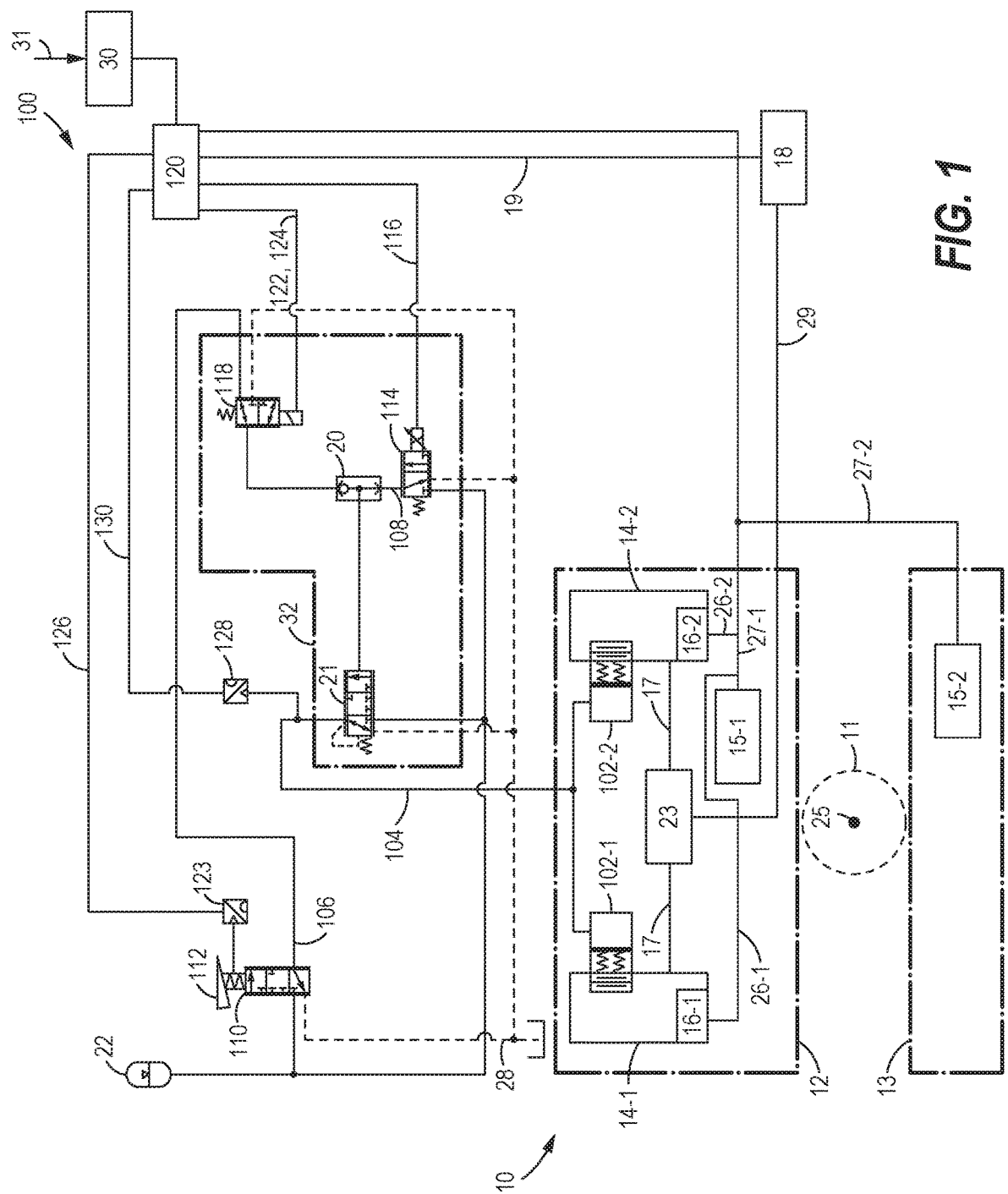
FIG. 1 depicts a first braking system for an articulated vehicle, in accordance with an embodiment of the present disclosure.

Turning first to FIG. 1, FIG. 1 depicts a first brake system 100 for use in braking an articulated vehicle 10. The articulated vehicle 10 includes a front cab 12 and a rear body 13 separated by an articulation joint 11 (depicted as a dashed outline in FIGS. 1 and 2). The front cab 12 may include an operator compartment and support the engine. The rear body 13 may support a dump body, a trailer, or other similar structures. The front cab 12 and rear body 13 may rotate relative to each other at the articulation joint 11, that rotates about the vertical axis 25.

The articulated vehicle 10 may include traction devices 14 that serve as ground engaging members for the articulated vehicle 10. For example, the traction devices 14 may include a left-side traction device 14-1 and a right-side traction device 14-2. The traction devices 14 may be disposed on opposite sides of an axle 17 that extends between the left-side traction device 14-1 and the right-side traction device 14-2. The axle 17 may receive drive power from the engine (not depicted) through a portion of the transmission 23 (e.g., a differential gear). In some embodiments, the transmission 23 includes differential locks for each axle that are configured to operate between a differential permissive state and a differential locked state responsive to receiving a differential control signal.

A brake assembly 102 may be coupled to the traction device 14. The brake assembly 102 is configured to receive a brake-assembly pressure 104 and to correspondingly reduce a rotational speed of the traction device 14, for example by compressing pads to a rotor. As depicted in FIG. 1, the articulated vehicle 10 includes two front brake assemblies 102. The brake assembly 102-1 is coupled to the left-side traction device 14-1 and the brake assembly 102-2 is coupled to the right-side traction device 14-2. In some embodiments, the brake-assembly pressure 104 may be applied equally to each of the brake assemblies 102-1 and 102-2 on the left and right side of the articulated vehicle 10. Although it is envisioned that a separate left-side brake-assembly pressure and a right-side brake-assembly pressure may be applied to the respective brake assemblies 102.

Though not depicted in FIG. 1, it is envisioned that the rear body 13 further includes rear traction devices, coupled to brake assemblies, that support the rear body 13. In one embodiment, the rear body 13 is supported by two left-side traction members and two right-side traction members. The brake assemblies coupled to the rear traction members may be operated by the same brake-assembly pressure 104 that operates the brake assemblies 102-1 and 102-2 for the front traction devices 14, or in some embodiments, a separate rear brake-assembly pressure may operate the brake assemblies associated with the traction members supporting the rear body 13.

The brake assemblies 102 may receive the associated brake-assembly pressure 104 from a source of pressurized hydraulic fluid 22. As seen in FIG. 1, the source of pressurized hydraulic fluid 22 is provided to a hydro-mechanical brake control valve 110, an electro-mechanical brake control valve 114, and a relay 21. A brake pedal 112 is coupled to the hydro-mechanical brake control valve 110. When the brake pedal 112 is displaced, for example by an operator depressing the brake pedal 112, the hydro-mechanical brake control valve 110 repositions (e.g., its spool repositions) to produce a hydro-mechanical pressure signal 106. The hydro-mechanical pressure signal 106 is provided to a blocking valve 118.

When the blocking valve 118 is in an open position (as depicted in FIG. 1), the hydro-mechanical pressure signal 106 is put in fluid communication with the resolver 20. When the blocking valve 118 is in a closed position, the hydro-mechanical pressure signal 106 is blocked from being in fluid communication with the resolver 20. In its closed position, the blocking valve 118 aligns a fluid path between the resolver 20 and a drain 28. As such, when the blocking valve 118 is in an open position, the hydro-mechanical pressure signal 106 is permitted to control the brake-assembly pressure 104, and when the blocking valve 118 is in a closed position, the hydro-mechanical pressure signal 106 is blocked from being permitted to control the brake-assembly pressure 104.

The first brake system 100 further includes an electro-mechanical brake control valve 114 that is configured to output an electro-mechanical pressure signal 108 that is based on an antilock brake system (ABS) control signal 116. The electro-mechanical brake control valve 114 is in fluid communication with the source of pressurized hydraulic fluid 22, the resolver 20, and the drain 28. A spool of the electro-mechanical brake control valve 114 repositions responsive to the ABS control signal 116, and provides the electro-mechanical pressure signal 108 to the resolver 20.

The resolver 20 selects the higher of the two control signal pressures between the blocking valve 118 and the electro-mechanical brake control valve 114, and provides the higher control signal pressure to the relay 21. A spool of the relay 21 repositions based on the control signal selected by the resolver 20. As the spool of the relay 21 repositions, the source of pressurized hydraulic fluid 22 is supplied to the brake-assembly pressure 104. The brake-assembly pressure 104 is provided to the brake assemblies 102-1, 102-2 to reduce the rotational speed of the respective traction device.

In some embodiments, the blocking valve 118, the electro-mechanical brake control valve 114, the resolver 20, and the relay 21 are disposed in a valve casing 32 manufactured to house the various components. The valve casing may be a cast component, a machined component, or it may be realized by plumbing together the individual components (e.g., the electro-mechanical brake control valve 114, the resolver 20, and the relay 21).

The first brake system 100 further includes a brake controller 120 in communication with the blocking valve 118 and the electro-mechanical brake control valve 114. The brake controller 120 is configured to determine a target corner speed for the traction device 14 based at least in part on a speed of the articulated vehicle 10 and a desired slip ratio. As the articulated vehicle 10 maneuvers through a work site, the traction devices 14 rotate about the axle 17. To reduce a speed of the articulated vehicle 10, the brake-assembly pressure 104 is applied to the brake assemblies 102 to reduce the rotational speed of the traction devices 14.

When the traction device 14 is in positive engagement with a ground surface, a bottom surface of the traction device is in stationary contact with the ground surface. At times, the traction device may spin (e.g., too much acceleration power provided to the traction device 14 through the transmission 23) or skid (e.g., too much braking power provided to the traction device 14 through the brake assembly 102). In particular when braking the articulated vehicle 10, applying too much braking power may cause the vehicle to skid, reduce the ability of an operator to steer the articulated vehicle 10, or increase a stopping distance of the articulated vehicle 10. When the traction device 14 is in positive engagement with the ground surface, the rotational speed of the traction device 14 may be used as an input to the speed of the articulated vehicle 10.

When braking, a target corner speed may be determined for the traction device 14 based on a desired slip ratio and a speed of the articulated vehicle 10. The speed of the articulated vehicle 10 may be determined any number of ways and provided to the brake controller 120. For example, the speed of the articulated vehicle may be based on a speedometer measurement before a braking event, a measurement from an inertial measurement unit (IMU), a global positioning system (GPS), or the like. In some embodiments, the IMU is a six degree of freedom (DOF) IMU configured to determine a velocity, pitch, roll, yaw, and heading of the articulated vehicle 10.

In some embodiments, an IMU 15-1 is disposed in the front cab 12, an IMU 15-2 is disposed in the rear body 13, and IMU measurements are provided via the communication paths 27-1 and 27-2 to the brake controller 120. A corner speed at the location of each traction device may be determined based on the IMU measurements. The corner speeds account for varying speeds based on a steering angle of the articulated vehicle 10, and may be used as the vehicle speed when determining the target corner speed for each associated traction device 14. As such, the traction device speed of each traction device located at a corner of the articulated vehicle 10 may be compared to the respective target corner speed associated with each corner of the articulated vehicle 10.

A traction device speed may be determined by a speed sensor 16. As depicted in FIG. 1, the speed sensor 16-1 determines a speed of the traction device 14-1, and provides the left-side traction device speed 26-1 to the brake controller 120. The speed sensor 16-2 similarly provides the right-side traction device speed 26-2 to the brake controller. The traction device speed 26 may be the actual linear speed of each traction device hub.

The desired slip ratio may be based on a desired amount of skidding of the traction device 14 over the ground surface. If the brake-assembly pressure 104 controlled by the hydro-mechanical pressure signal is too high, the traction device 14 may stop rotating while the articulated vehicle 10 continues to move over the ground surface. The brake controller 120 may determine that the traction device speed is less than the target corner speed for a given traction device 14.

Responsive to determining that the traction device speed is less than the target corner speed, the brake controller 120 may transmit, to the blocking valve 118, an isolation signal 122 configured to close the blocking valve. In some embodiments, the blocking valve 118 is a normally open valve, and the isolation signal 122 causes the blocking valve 118 to energize and close. Thus, in the event of a loss of electrical power distributed through the articulated vehicle 10, the articulated vehicle 10 maintains the ability to permit the hydro-mechanical brake control valve 110 to control the brake-assembly pressure 104. With the blocking valve 118 closed, the hydro-mechanical pressure signal 106 is blocked from the resolver 20.

Further, the brake controller 120 determines a commanded ABS brake pressure. The commanded ABS brake pressure may be determined based on the displacement of the brake pedal 112. In such an embodiment, the brake pedal 112 is coupled to a brake pedal position sensor 123 that is configured to determine a displacement of the brake pedal 112 and provide a position measurement 126 of the brake pedal displacement to the brake controller 120. The brake controller 120 may correlate the position measurement 126 to an ABS commanded brake pressure via a reference table.

The brake controller 120 transmits, to the electro-mechanical brake control valve 114 an ABS control signal 116 that is based on the commanded ABS brake pressure. As such, the electro-mechanical brake control valve 114 repositions to align the source of pressurized hydraulic fluid 22 with the resolver 20. In such an embodiment, the blocking valve 118 is closed providing nominal (e.g., atmospheric) pressure to a top portion (as depicted in FIG. 1) of the resolver 20 and the electro-mechanical brake control valve 114 is repositioned to provide the electro-mechanical pressure signal 108 to the bottom portion (as depicted in FIG. 1). As such, the resolver 20 selects the electro-mechanical pressure signal 108 to control the operation of the relay 21. The relay 21 then repositions to align the source of pressurized hydraulic fluid 22 to supply the brake-assembly pressure 104. Thus, it is the electro-mechanical brake control valve 114 controlling the operations of the brake assemblies 102.

While FIG. 1 depicts the operation of the first brake system 100 associated with the traction devices 14 disposed on the front cab 12 of the articulated vehicle 10, it is appreciated that the first brake system 100 may be further modified to operate brake assemblies 102 associated with traction devices 14 disposed on the rear body 13 of the articulated vehicle 10.

In some embodiments, the brake-assembly pressure 104 is provided to both front cab and rear body brake assemblies 102. In yet another embodiment, a separate set of a blocking valve 118, an electro-mechanical brake control valve 114, a resolver 20, and a relay 21 may be disposed in a valve casing, and configured to provide a rear brake-assembly pressure to brake assemblies 102 associated with the rear traction devices 14.

Control of the brake assemblies 102 may be restored to the hydro-mechanical brake control valve 110. In such an embodiment, the first brake system 100 may further include a brake-assembly pressure gage 128 that measures the pressure of the brake-assembly pressure 104. The brake-assembly pressure gage 128 provides the brake-assembly pressure measurement 130 to the brake controller 120. The brake controller 120 may further be configured to determine a desired braking pressure based on the position measurement from the brake pedal position sensor 123.

Responsive to determining that the brake-assembly pressure measurement 130 is higher than the desired braking pressure, the brake controller 120 provides the blocking valve 118 a permissive signal 124 to open the blocking valve 118. For example, the permissive signal 124 may be a de-energization of the isolation signal 122, which causes the blocking valve 118 to open. Further, the brake controller 120 may also reduce the magnitude of the ABS control signal 116 to cause the electro-mechanical brake control valve 114 to reposition to reduce the electro-mechanical pressure signal 108. As such, when the pressure at the resolver 20 received from the hydro-mechanical pressure signal 106 via the open blocking valve 118 is higher than the reduced electro-mechanical pressure signal 108, the resolver 20 selects the hydro-mechanical pressure signal 106 to control the position of the relay 21 (e.g., the position of a spool of the relay 21).

In some embodiments, the articulated vehicle 10 includes a right-side traction device 14-2 and a left-side traction device 14-1. An axle may extend between the right-side traction device 14-2 and the left-side traction device 14-1 to provide driving power. In such an embodiment, the brake controller 120 may be configured to determine a target corner speed for each of the right-side traction device 14-2 and the left-side traction device 14-1. These may be different target corner speeds based on a steering angle of the articulated vehicle 10.

In embodiments with both a left-side and a right-side traction device 14, determining if a target corner speed is less than a traction device speed may be based on one or both of the comparisons between the target corner speed and the traction device speed. In other words, the condition that the traction device speed is less than the target corner speed may be satisfied by one of either the left-side and right-side traction device speeds being less than the respective target corner speed or by requiring both of the left-side and right-side traction device speeds being less than the respective target corner speed.

The selection of allowing one of, or requiring both of, the left-side and right-side traction device speeds being less than the respective target corner speed may be determined based on a desired articulated vehicle performance. In general, permitting one of the traction device speeds being less than the respective target corner speed to trigger an ABS braking event (e.g., transmission of isolation signal and ABS control signal), permits for more aggressive braking. Alternatively, requiring both of the traction device speeds to be less than the respective target corner speed to trigger the ABS braking event permits for more accurate steering. This distinction may be hard-coded into the brake controller 120, be variable based on the brake pedal 112 displacement, or the like.

The articulated vehicle 10 may be operating on a worksite having various ground surfaces. For example, a right-side traction device may be positioned on a low-friction surface like ice and a left-side traction device may be positioned on a high friction surface like gravel. When stopping the articulated vehicle 10, greater steering control may be provided to the articulated vehicle 10 if both traction devices are below the respective target corner speed before closing the blocking valve 118 and controlling the brake-assembly pressure 104 via the electro-mechanical pressure signal 108. Conversely, a shorter stopping distance of the articulated vehicle 10 may be realized if only one of the traction devices is below the respective target corner speed before closing the blocking valve 118 and controlling the brake-assembly pressure 104 via the electro-mechanical pressure signal 108.

The articulated vehicle 10 may further be equipped with an engine braking system that is configured to reduce the rotational speed of the traction device. The engine braking system (not depicted) may normally provide a braking force to the traction devices by way of utilizing losses through the drive train to slow the rotational speed of the traction device by way of the transmission 23. When the electro-mechanical brake control valve 114 is controlling the brake-assembly pressure 104 (e.g., when the traction device speed is less than the target corner speed, during an ABS braking event), the brake controller 120 may further be configured to provide a transmission controller 18 a transmission-override signal 19. The transmission controller 18 may be configured to control the amount of engine braking provided through the transmission. Responsive to receiving the transmission-override signal 19, the transmission controller 18 may remove the engine braking (e.g., disengage engine from the power train) provided via the transmission 23 so as not to interfere with the brake system 100 control of the traction device speed. The transmission controller 18 may further maintain gearing through the ABS braking event and resume normal control and operations of shifting gears and engine braking after the ABS braking event.

Figure 2:
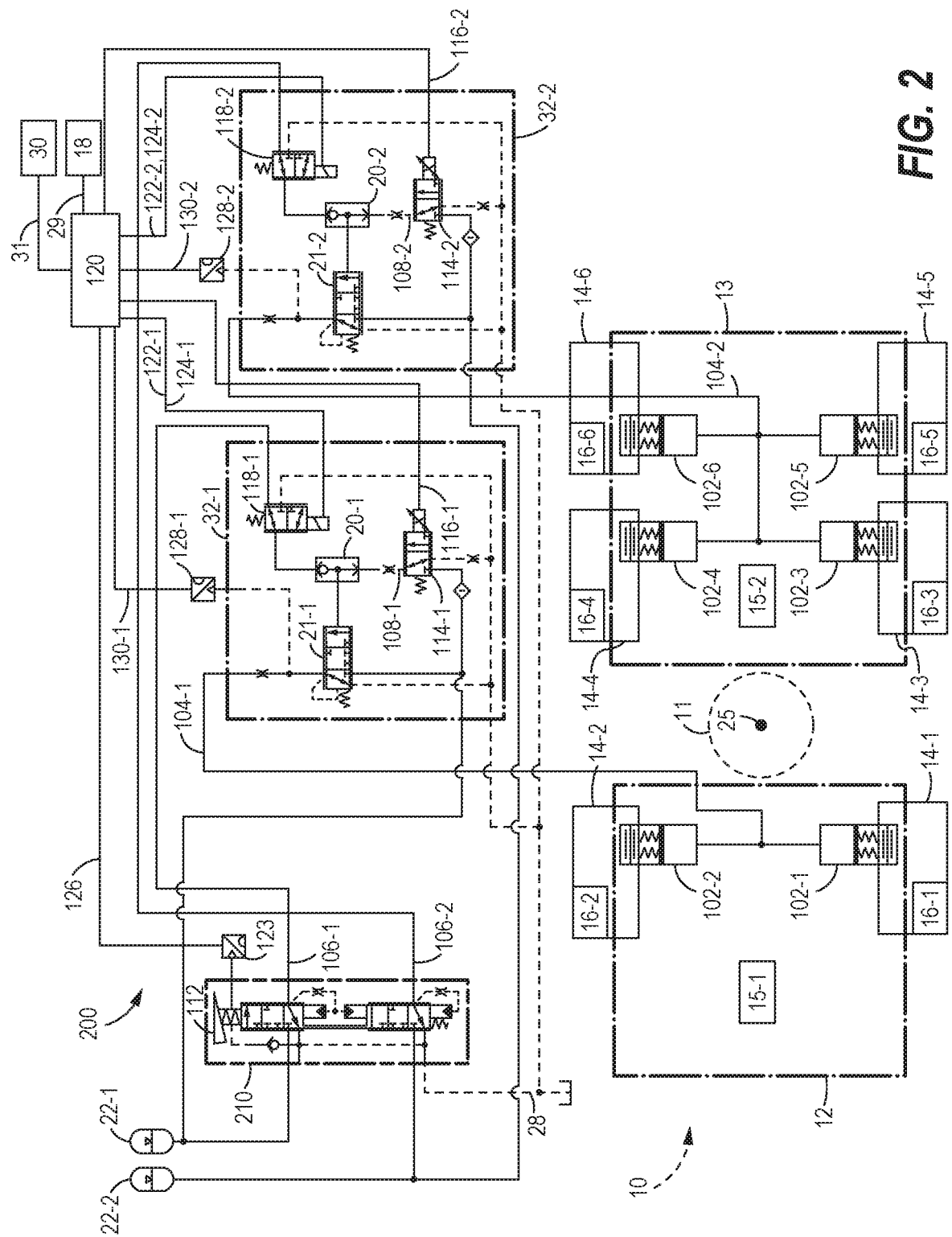
FIG. 2 depicts a second braking system for an articulated vehicle, in accordance with an embodiment of the present disclosure.

FIG. 2 depicts a second brake system for an articulated machine, in accordance with an embodiment of the present disclosure. In particular, FIG. 2 depicts the second brake system 200 that is similar to the first brake system 100 of FIG. 1. Similar functioning components of the brake systems 100 and 200 are numbered similarly throughout.

In general, the second brake system 200 is similar to the first brake system 100, but provides further details of operations of the brake assemblies 102 disposed in both a front cab 12 and a rear body 13. As such, the articulated vehicle 10 includes a front cab 12 having the traction device 14-1 coupled to the brake assembly 102-1 on the left side and the traction device 14-2 coupled to the brake assembly 102-2 on the right side. The brake assemblies 102-1 and 102-2 are operated by the front brake-assembly pressure 104-1.

The rear body 13 is separated from the front cab 12 by the articulation joint 11 that rotates about the vertical axis 25. The rear body 13 includes four traction devices, two on the left side and two on the right side, although other arrangements are possible. Here, the two left-side traction devices 14-3 and 14-5 are coupled to the brake assemblies 102-3 and 102-5, respectively, and the two right-side traction devices 14-4 and 14-6 are coupled to the brake assemblies 102-4 and 102-6, respectively. The brake assemblies 102-3, 102-4, 102-5, and 102-6 are operated by the rear brake-assembly pressure 104-2.

The articulated vehicle 10 may include a front valve casing 32-1, disposed in the front cab 12, that houses the front blocking valve 118-1, the front resolver 20-1, the front electro-mechanical brake control valve 114-1, and the front relay 21-1. The articulated vehicle 10 may also include a rear valve casing 32-2, disposed in the rear body 13, that houses the rear blocking valve 118-2, the rear resolver 20-2, the rear electro-mechanical brake control valve 114-2, and the rear relay 21-2. Operation of the components in the front valve casing 32-1 and the rear valve casing 32-2 may be similar to that of the components of the valve casing 32 discussed more fully in conjunction with the first brake system 100 of FIG. 1.

The hydro-mechanical brake control valve 210 is similar to the hydro-mechanical brake control valve 110 of FIG. 1, but is configured to provide both a front hydro-mechanical pressure signal 106-1 and a rear hydro-mechanical pressure signal 106-2 to operate brake assemblies in both the front cab 12 and the rear body 13. The front source of pressurized hydraulic fluid 22-1 provides the hydraulic pressure for the front hydro-mechanical pressure signal 106-1 and the rear source of pressurized hydraulic fluid 22-2 provides the hydraulic pressure for the rear hydro-mechanical pressure signal 106-2. While the front and rear sources of pressurized hydraulic fluid 22-1 and 22-2 may be at the same operating pressure, it is envisioned that the sources of pressurized hydraulic fluid may operate at different operating pressures for operations of the front and rear brake assemblies 102.

The brake pedal 112 is mechanically coupled to the hydro-mechanical brake control valve 210, and depression of the brake pedal 112 causes hydro-mechanical brake control valve 210 to produce the front hydro-mechanical pressure signal 106-1 and the rear hydro-mechanical pressure signal 106-2 based on the displacement of the brake pedal 112.

The front hydro-mechanical pressure signal 106-1 is provided to the front blocking valve 118-1, and the rear hydro-mechanical pressure signal 106-2 is provided to the rear blocking valve 118-2.

The brake controller 120 is configured to receive and/or provide the brake pedal position measurement 126, a front and a rear brake-assembly pressure measurement 130-1, 130-2, front blocking valve isolation and permissive signals 122-1, 124-1, rear blocking valve isolation and permissive signals 122-2, 124-2, and front and rear ABS control signals 116-1, 116-2. The brake controller 120 may further be in communication with the steering controller 30 and the transmission controller 18.

The brake controller 120 determines a respective target corner speed for the front and rear traction devices based at least in part on a speed of the articulated vehicle and a desired slip ratio. As discussed above, the speed of the articulated vehicle may be based on a corner speed at a location of each of the traction devices 14. The brake controller 120 may further determine that a speed of a traction device is less than a respective target corner speed of the traction device and responsively initiate an ABS braking event. An ABS braking event may include transmitting an isolation signal to the front and rear blocking valves 118-1, 118-2, determining a commanded ABS brake pressure, and transmitting a front and a rear ABS control signal 116-1, 116-2 to a respective front and rear electro-mechanical brake control valve 114-1, 114-2.

The isolation signals 122-1, 122-2 cause the respective front and rear blocking valves 118-1, 118-2 to close. In some embodiments, the front and rear blocking valves 118-1, 118-2 are normally open valves and the respective isolation signal causes the blocking valve to energize and close.

In some embodiments, the front and the rear ABS control signals may be different during an ABS braking event. In one particular example, the brake controller 120 is configured to maintain electro-mechanical braking with the front brake assemblies 102-1, 102-2, while intermittently removing the rear brake-assembly pressure 104-2 to allow the rear traction devices 14-4 to 14-6 to freely spin. The rear brake-assembly pressure 104-2 may be removed in part by reducing the rear ABS control signal 116-2 to reduce the rear electro-mechanical pressure signal 108-2.

With the rear brake-assembly pressure 104-2 removed, the rear traction devices 14-4 to 14-6 may spin freely. Respective traction device speed sensors 16-3 to 16-5 may provide the brake controller 120 with updated traction device speed measurements. Because the rear traction devices 14 are spinning freely, they may be used to update the speed of the articulated vehicle as determined by the IMUs 15-1, 15-2.

The brake controller may continually, or periodically, remove the rear brake-assembly pressure 104-2 as needed to maintain accurate articulated vehicle speed measurements. The rear brake-assembly pressure 104-2 is selected to be removed instead of the front brake-assembly pressure 104-1 as it is anticipated that the front brake-assembly provides the majority of the stopping power to the articulated vehicle 10. The duration of the removal of the rear brake-assembly pressure 104-2 being removed may be on the order of one-half second, although certainly other time durations may be selected. For example, the duration may be based on an estimated speed of the articulated vehicle, a magnitude of the difference between the vehicle speed and the traction device speed, and the like.

A steering controller 30 may receive a steering angle input 31 indicative of a degree of steering (e.g., rotation of the front cab 12 in relation to the rear body 13, position of a steering wheel) of the articulated vehicle. Based on the steering angle, the brake controller 120 may receive an input from the steering controller 30 indicative of a desired steering angle. To provide for more accurate steering, the brake controller 120 may provide a signal to the transmission 23 (e.g., provide a differential open signal to the transmission 23, provide a differential lock signal to the transmission 23) to open or close the axle differential lock for each axle to control torque distribution to the traction devices.

Similar to the first brake system 100, the brake pedal position sensor 123 determines a displacement of the brake pedal 112 and provides the brake pedal position measurement to the brake controller 120. A desired braking pressure may be determined based on the brake pedal position measurement. Responsive to determining that one of the front and rear brake-assembly pressure measurements 130-1, 130-3 is higher than the desired brake pressure, the brake controller may be further configured to provide the front and rear blocking valves 118-1, 118-2 a permissive signal 124-1, 124-2 that is configured to open the respective front and rear blocking valves 118-1, 118-2.

INDUSTRIAL APPLICABILITY

Figure 3:
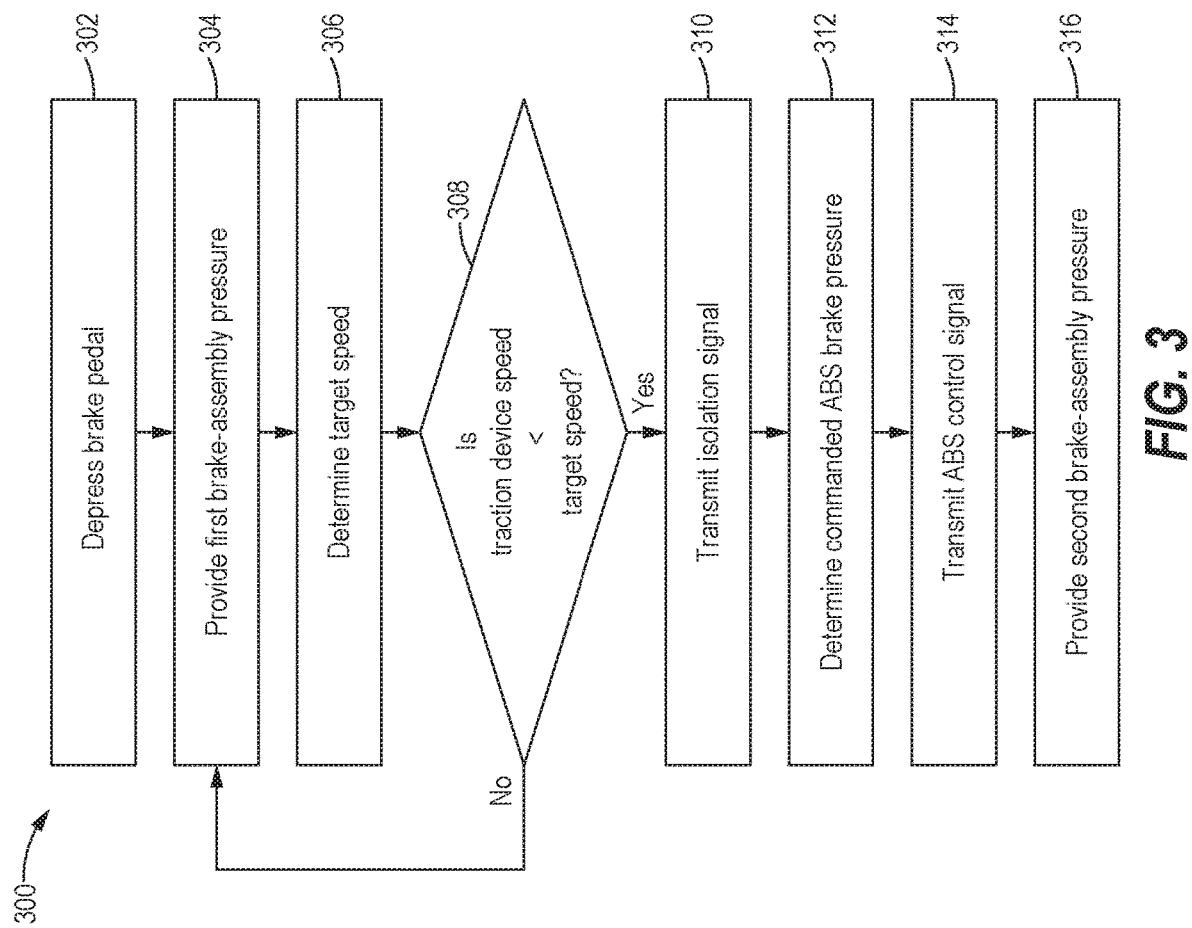
FIG. 3 depicts a method of braking an articulated vehicle, in accordance with an embodiment of the present disclosure.

In general, the teachings of the present disclosure may find applicability in many brake systems for articulated machines. For instance, the teachings of the present disclosure may be applicable to articulated mining machines, truck trailers, articulated busses and the like. In one example, the method 300 of FIG. 3 may be utilized with a brake system of an articulated machine. By way of example, the first brake system 100 of FIG. 1 will be used in conjunction with the description of the method 300. It is envisioned that one with skill in the art may also perform the method 300 with the second brake system 200 of FIG. 2.

The method 300 includes depressing a brake pedal at 302, providing a first brake-assembly pressure to a brake assembly at 304, determining a target corner speed for the traction device at 306, determining if a traction device is less than a target corner speed at 308, transmitting an isolation signal at 310, determining a commanded ABS brake pressure at 312, transmitting an ABS control signal at 314, and providing a second brake-assembly pressure at 316.

At 302, a brake pedal 112 is mechanically coupled to a hydro-mechanical brake control valve and produces a hydro-mechanical pressure signal 106 when depressed. The hydro-mechanical pressure signal 106 is created by repositioning the hydro-mechanical brake control valve 110 to align the source of pressurized hydraulic fluid 22 to be in fluid communication with the blocking valve 118.

At 304, a first brake-assembly pressure is provided to a brake assembly 102. The brake assembly 102 is coupled to a traction device 14 and the first brake-assembly pressure is based on the hydro-mechanical pressure signal 106 that is configured to reduce a rotational speed of the traction device 14. The first brake-assembly pressure is provided from the source of pressurized hydraulic fluid 22, through the hydro-mechanical brake control valve 110, through a normally open blocking valve 118, to the resolver 20, to control repositioning of the relay 21. Based on the repositioning of the relay 21, the source of pressurized hydraulic fluid 22 is put in fluid communication with the brake assemblies 102 to apply a braking pressure to the traction device 14.

At 306, a target corner speed for the traction device 14 is determined based at least in part on a speed of the articulated vehicle 10 and a desired slip ratio.

At 308, a determination is made if the traction device speed is less than the target corner speed. If not, the first brake-assembly pressure is provided at 304. If the traction device speed is less than the target corner speed, an isolation signal is transmitted by a brake controller to a blocking valve at 310. The isolation signal is configured to close the blocking valve 118. When the blocking valve 118 is in an open position, the hydro-mechanical pressure signal 106 controls the first brake-assembly pressure. When the blocking valve 118 is in a closed position the hydro-mechanical pressure signal is blocked from controlling the first brake-assembly pressure. This is in part realized by the resolver 20 selecting a higher pressure between the electro-mechanical pressure signal 108 and the hydro-mechanical pressure signal 106, and operation of the blocking valve 118.

At 312, a commanded ABS brake pressure is determined based on the depression of the brake pedal 112. At 314, the brake controller transmits, to the electro-mechanical brake control valve 114, an ABS control signal 116 that is based on the commanded ABS brake pressure.

At 316, a second brake-assembly pressure is provided to the brake assembly 102. The second brake-assembly pressure is based on the commanded ABS brake pressure from the electro-mechanical brake control valve 114.

The method 300 may further include determining a desired braking pressure based on a displacement of the brake pedal 112. Responsive to determining that the second brake-assembly pressure (e.g., via pressure measurement 130 during an ABS braking event) is greater than the desired braking pressure, the blocking valve 118 provides a permissive signal that is configured to open the blocking valve 118.

In some embodiments, the blocking valve 118 is a normally open valve, and energizing the blocking valve 118 causes the valve to position to a shut position that isolates the hydro-mechanical pressure signal 106 from the resolver 20.

It is further envisioned that the method 300 may further include interaction with the transmission and steering controllers, brake operation split between the front cab and the rear body, and the like as discussed more fully throughout.

From the foregoing, it can be seen that the present disclosure sets forth a brake system for an articulated vehicle. Moreover, it provides for means for providing brake-assembly pressures to brake assemblies by both hydro-mechanical and electro-mechanical means.

What is claimed:

1. A brake system for an articulated vehicle, the brake system comprising:
   a brake assembly coupled to a traction device, the brake assembly configured to apply a brake-assembly pressure to reduce a rotational speed of the traction device, the brake-assembly pressure being based on one of a hydro-mechanical pressure signal and an electro-mechanical pressure signal;
   a hydro-mechanical brake control valve configured to output the hydro-mechanical pressure signal that is based on a displacement of a brake pedal;
   an electro-mechanical brake control valve configured to output the electro-mechanical pressure signal that is based on an antilock brake system (ABS) control signal;
   a blocking valve configured to permit the hydro-mechanical pressure signal to control the brake-assembly pressure when the blocking valve is open and to block the hydro-mechanical pressure signal from controlling the brake-assembly pressure when the blocking valve is closed; and
   a brake controller configured to:
      determine a target corner speed for the traction device based at least in part on a speed of the articulated vehicle and a desired slip ratio; and
      responsive to determining that a traction device speed is less than the target corner speed:
         transmit, to the blocking valve, an isolation signal configured to close the blocking valve;
         determine a commanded ABS brake pressure; and
         transmit, to the electro-mechanical brake control valve, an ABS control signal that is based on the commanded ABS brake pressure.

2. The brake system of claim 1, wherein the blocking valve is a normally open valve and the isolation signal causes the blocking valve to energize and close.

3. The brake system of claim 1, further comprising a brake pedal position sensor, wherein the brake controller determines the commanded ABS brake pressure based on a position measurement received from the brake pedal position sensor, the position measurement being indicative of the displacement of the brake pedal.

4. The brake system of claim 3, further comprising a brake-assembly pressure gage that provides a brake-assembly pressure measurement to the brake controller, wherein the brake controller is further configured to:
   determine a desired brake pressure based on the position measurement; and
   responsive to determining that the brake-assembly pressure measurement is higher than the desired brake pressure, provide the blocking valve a permissive signal configured to open the blocking valve.

5. The brake system of claim 1, wherein the speed of the articulated vehicle is determined based at least in part from a measurement received from a six-degree-of-freedom (DOF) inertial measurement unit (IMU).

6. The brake system of claim 5, wherein:
the traction device comprises a right-side traction device disposed on an opposing side of an axle from a left-side traction device, the axle extending between the right-side traction device and the left-side traction device;
the brake controller is further configured to determine a right-side traction-device target corner speed and a left-side traction-device target corner speed; and
determining that the traction device speed is less than the target corner speed comprises comparing one of a left-side traction device speed and a right-side traction device speed with a respective one of a left-side target corner speed and a right-side target corner speed of the articulated vehicle.

7. The brake system of claim 5, wherein:
the traction device comprises a right-side traction device disposed on an opposing side of an axle from a left-side traction device, the axle extending between the right-side traction device and the left-side traction device;
the brake controller is further configured to determine a right-side traction-device target corner speed and a left-side traction-device target corner speed; and
determining that the traction device speed is less than the target corner speed comprises comparing both of a left-side traction device speed and a right-side traction device speed with a respective both of the left-side traction-device target corner speed and the right-side traction-device target corner speed.

8. The brake system of claim 1, wherein the brake controller is further configured to provide, to a transmission controller, a transmission-override signal when the traction device speed is less than the target corner speed.

9. A method of braking an articulated vehicle, the method comprising:
depressing a brake pedal mechanically coupled to a hydro-mechanical brake control valve to produce a hydro-mechanical pressure signal;
providing a first brake-assembly pressure to a brake assembly, the brake assembly being coupled to a traction device and the first brake-assembly pressure is based on the hydro-mechanical pressure signal and is configured to reduce a rotational speed of the traction device;
determining a target corner speed for the traction device based at least in part on a speed of the articulated vehicle and a desired slip ratio;
responsive to determining that a traction device speed is less than the target corner speed, transmitting, by a brake controller to a blocking valve, an isolation signal configured to close the blocking valve, wherein when the blocking valve is in an open position the hydro-mechanical pressure signal controls the first brake-assembly pressure and when the blocking valve is in a closed position the hydro-mechanical pressure signal is blocked from controlling the first brake-assembly pressure;
determining a commanded ABS brake pressure based on the depression of the brake pedal;
transmitting, from the brake controller to an electro-mechanical brake control valve, an ABS control signal that is based on the commanded ABS brake pressure; and
providing a second brake-assembly pressure to the brake assembly, the second brake-assembly pressure being based on the commanded ABS brake pressure.

10. The method of claim 9, wherein transmitting the isolation signal to the blocking valve comprises energizing the blocking valve to shut the blocking valve.

11. The method of claim 9, further comprising:
determining a desired braking pressure based on a displacement of the brake pedal; and
responsive to determining that the second brake-assembly pressure is greater than the desired braking pressure, providing to the blocking valve a permissive signal configured to open the blocking valve.

12. The method of claim 11, wherein providing the permissive signal to the blocking valve comprises de-energizing the blocking valve causing the blocking valve to open.

* * * * *